United States Patent [19]

Nuyts

[11] Patent Number: 5,174,404

[45] Date of Patent: Dec. 29, 1992

[54] MOBILE DEVICE FOR WEIGHING A LOAD

[75] Inventor: Henry Nuyts, Retie, Belgium

[73] Assignee: NV Nuyts ORB, Oud-Turnhout, Belgium

[21] Appl. No.: 762,684

[22] Filed: Sep. 20, 1991

[30] Foreign Application Priority Data

Sep. 21, 1990 [BE] Belgium ............................ 9000899

[51] Int. Cl.$^5$ ............................................. G01G 21/24
[52] U.S. Cl. ................................. 177/255; 177/DIG. 9
[58] Field of Search ......................... 177/255, DIG. 9

[56] References Cited

U.S. PATENT DOCUMENTS 4,088,198  5/1978  Wirth ........................... 177/DIG. 9
4,523,653  6/1985  Scrivener et al. ................. 177/147
4,703,816 11/1987  Saner ............................. 177/255 X Primary Examiner—George H. Miller, Jr.
Attorney, Agent, or Firm—Foley & Lardner

[57] ABSTRACT

Mobile weighing device such as a device for mounting on a truck. Said device comprises a framework and a loadingframe which are flexible connected to each other by means of connecting elements being connected to said parts by means of universal joints. Said joints are integrated into power receiving members which are formed by or are forming part of said connecting elements so that said joints are positioned at a minimum distance from each other. The load indicator, present in said power receiving member is positioned outside the space between said two universal joints.

13 Claims, 4 Drawing Sheets

MOBILE DEVICE FOR WEIGHING A LOAD

The invention relates to a mobile device for weighing a load, such as a weighing device which can be mounted on a truck, comprising a framework and a loadingframe being flexibly connected to each other by means of connecting elements such that the line running through the connecting points will always extend in vertical direction when a weighing is carried out, a free space being present around the loadingframe such that it remains free from the portions surrounding it also when the device is in an oblique position during weighing, power receiving members being present comprising load indicators for measuring the load exerted on said connecting elements.

Such a device is known by NL-B-184104. In case of this known device each load indicator is provided in a connecting element between the ends of this element, said ends being connected to either the framework or the loadingframe. This brings about that the ends of said connecting element are relatively wide spaced. By this distance the room which has to be present between the loadingframe and the parts surrounding it is fixed, such as the framework by which the loadingframe is carried. In case of an oblique position of the weighing device it has to be prevented that the loadingframe engages said surrounding parts through which no right weighing can be carried out.

Further clamping-moments might be exerted on the connecting elements by which the accuracy of the weighing might also be influenced.

Now the object of the invention is to remove these disadvantages and to that end it is provided that each connecting element is connected to both the framework and the loadingframe by means of a universal joint, said universal joints being integrated into the power receiving members so that they are positioned at a minimum distance from each other and that the load indicatior, present in said power receiving member is positioned outside the space between said two universal joints.

In this way it is obtained that the suspension points between framework and loadingframe are narrowly spaced so that the loadingframe will exert only a small sidewards movement in respect of the framework also in case of a considerable oblique position of the device. By the use of universal joints as indicated clamping moments can be prevented.

Further the maintenance of the device and the replacing of parts will be easier possible and the sensitive parts such as the load indicators can be positioned such that they are better protected against damage.

According to a first embodiment of a device the center of a load indicator will lie on the center line of the two joints belonging to it and the load indicator will be positioned such that it will always be in pressed condition during weighing.

In this case the possibility exists that the power receiving member comprises a bar both ends of which are coupled with a portion of the two universal joints cooperating with it, said bar extending through at least one of the joints and the load indicator present near this joint and the end of the bar extending outside said load indicator being provided with a means by which it engages that side of the load indicator lying opposite the side which engages said universal joint.

Another possibility is that said power receiving member comprises a bar both ends of which are connected to a portion of the two universal joints cooperating with it, said load indicator being positioned in the relating portion of one of said universal joints opposite the place where said bar is connected to said portion.

A good protection of said load indicator can be obtained when the power receiving member comprises a housing extending around said universal joints and is provided with sidewardly directed openings through which the parts of framework and loadingframe, connected to the universal joints, extend, said load indicator being comprised in said housing.

By this construction one has more freedom in choosing the load indicators and simultaneously these are protected by said housing.

According to another embodiment of the invention said bar or said housing can be connected to a pressurized medium cylinder extending in respect of said bar either said housing and said universal joints in such a way that by means of it said loadingframe can be brought to a position in which it engages fixed supports.

When said mobile device is moved the load indicators and the further parts of the weighing device are protected against damage by impacts and such like.

In that case the possibility exists that the pressurized medium cylinder serves as load indicator by measuring the pressure in said cylinder during weighing.

In case of the embodiments described above the load indicators will be positioned above or below one of the universal joints and will thus require some space in vertical direction. When the height of the device has to be decreased as much as possible it can be provided that said connecting element, being connected to both universal joints, extends outside the space between said universal joints.

In that case it can be provided that said connecting element is formed by arms extending substantially in horizontal direction from said universal joints, the ends of said arms opposite the universal joints being connected to each other.

Now the load indicators will be positioned at about the level of the universal joints and sidewards of these and it is possible that the device will require more space in said direction.

According to one embodiment the load indicator can be provided in one of said arms.

It is, however, also possible that the load indicator is positioned between both arms and at a position between the universal joints and the ends of said arms which are connected to each other.

In those cases the universal joints can be provided with means for equalizing the excentric weight of the arms and further parts connected to them. Obviously it is also possible that said arms extend from both sides of said universal joints to obtain a symmetrical construction so that no excentric loads are exerted on said joints.

The invention is now described by means of embodiments shown in the drawing, in which:

FIG. 1 schematically shows a vertical section of an embodiment of a device according to the invention;

FIG. 2 schematically shows a part of FIG. 1, a pressurized, medium cylinder being provided in it for bringing the device out of operation;

FIG. 3 shows the part of FIG. 2 but with the device in the non-operative position;

FIGS. 4 and 5 each schematically show a section according to FIG. 2, yet of somewhat modified embodiments;

Figure 6:
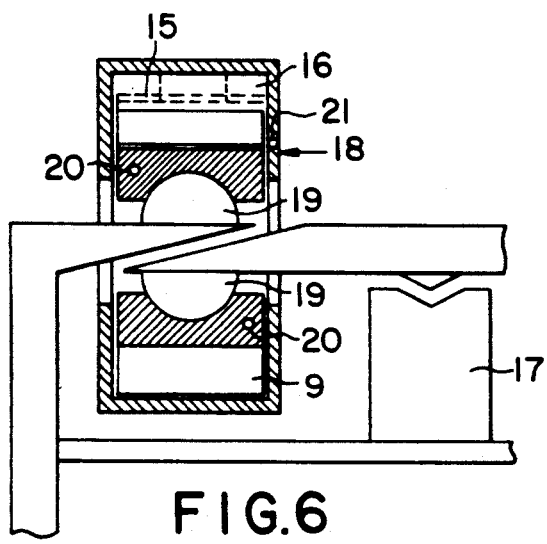
FIGS. 6 and 7 show sections according to FIGS. 2 and 3 resp., yet of a modified embodiment.
Figure 7:
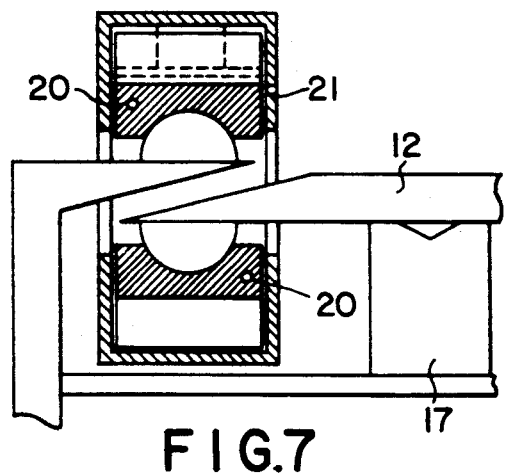
Figure 9:
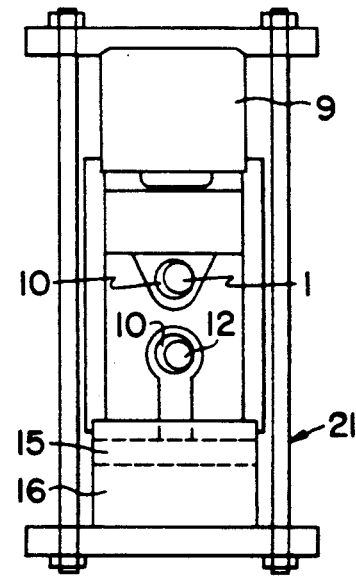
Figure 10:
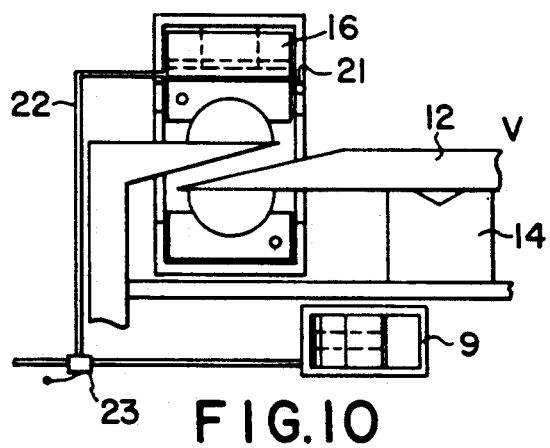
Figure 11:
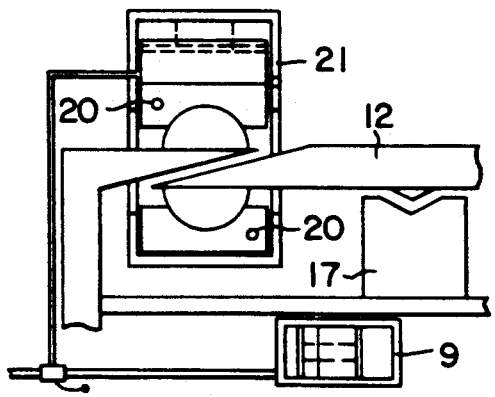
Figure 12:
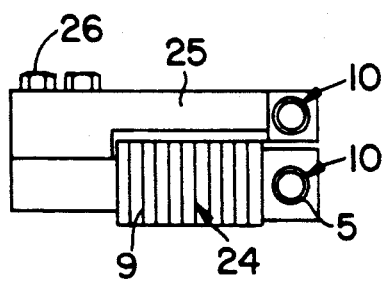
Figure 13:
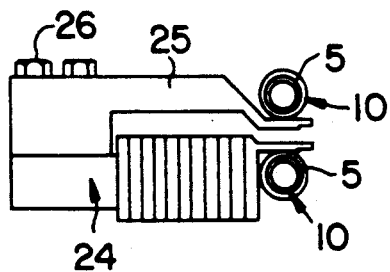
Figure 14:
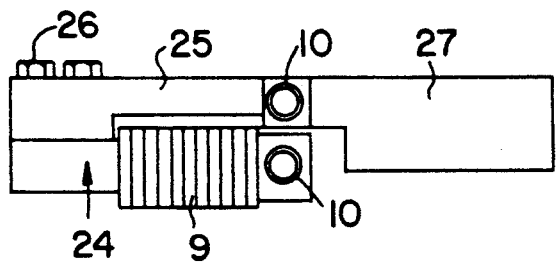
Figure 15:
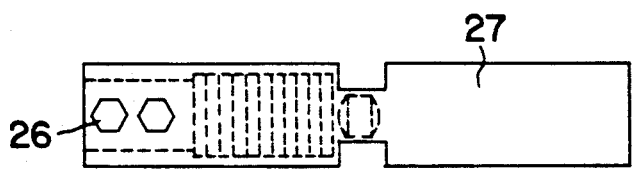
Figure 16:
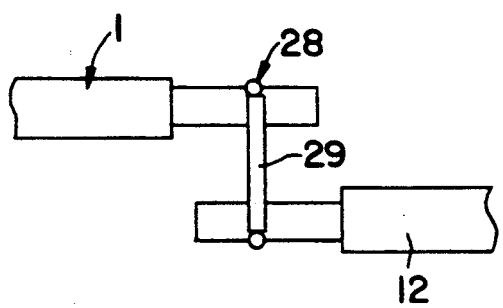
Figure 17:
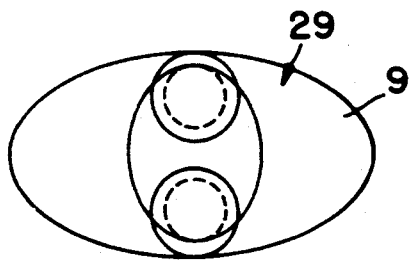

FIG. 9 schematically shows a side view, partly in cross section, of a part of a device according to the invention;

FIGS. 10 and 11 show the working of the device of the FIGS. 6 and 7;

FIGS. 12 and 13 both schematically show a view of corresponding parts of two universal joints being connected to each other by sidewardly extending arms;

FIG. 14 shows a view corresponding to FIG. 12, yet of an embodiment provided with a counter weight;

FIG. 15 shows a plan view of the device of FIG. 14;

FIGS. 16 and 17 schematically show a side and end view resp. of an other embodiment of a universal joint;

FIGS. 18 to 23 schematically show views corresponding to FIG. 12, yet each of them of another way of mounting the load indicators.

Figure 1:
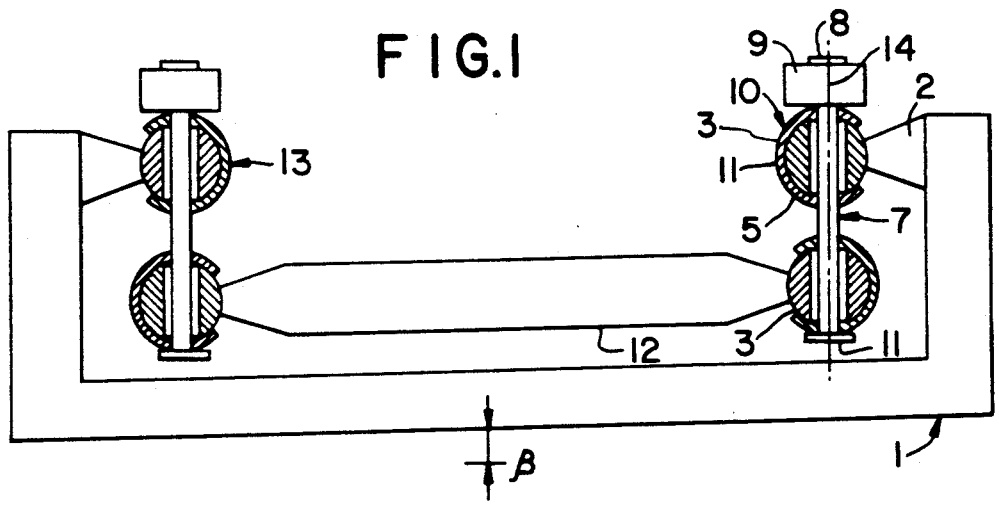

The device, schematically shown FIG. 1 comprises the framework 1 with supports 2 extending from it. Said supports 2 are connected to ball-shaped parts 3 each provided with a bore 4. The ball-shaped part 3 serves to support the spherical hollow part 5 provided with a bore 6 through which the bar 7 passes. The upper end 8 of the bar 7 is supported by the spherical part 5 via the load indicator 9. The parts 3 and 5 together are forming a universal joint 10. A corresponding universal joint 10 is provided at the lower end 11 of the bar 7, the part 3 of it being connected to the loadingframe 12 and the part 5 of it being supported by the lower end 11 of the bar 7. The bar 7 and the two universal joints 10 together can be considered as forming connecting elements 13.

In view of the fact that the bar 7 passes through the bores 6 of both universal joints 10 with play, the center line 14 of said bar 7 will always run vertically even when the framework 1 should make an angle $\beta$ with the horizontal plane. Obviously this angle $\beta$ has to be between certain limits.

The force exerted on the lower end 11 of the bar 7 can be determined by the load indicator 9. Said force comprises a part of the weight of the loadingframe 12 and of a load carried thereby, the weight of which has to be determined.

Generally speaking, the loadingframe 12 is supported at the four corners and thus four connecting elements 13 will be used. When, however, the loadingframe need only be used for suspending a load from it, two connecting elements 13 might suffice. In that case the loadingframe might also be in the shape of a container or such like.

Figure 2:
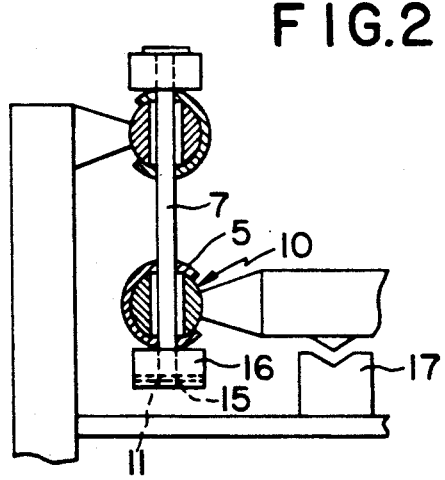
Figure 3:
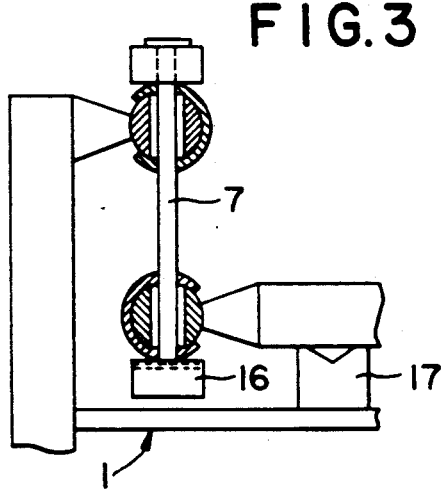

FIG. 2 shows the possibility to connect the lower end 11 of a bar 7 to the piston 15 of a pressurized medium cylinder 16 which is connected to the spherical part 5 of a universal-joint 10. During the operation of the device the piston 15 is at its lowest position in the cylinder 16 and when the device has to be put out of operation the piston 15 is moved to its highest position such that the loadingframe 12 will be supported by supports 17 connected to the framework 1. This position of the loadingframe 12 is shown in FIG. 3. Now the device can be transported without the risk of damage to the device as a whole and in particular to the load indicators 9.

Figure 4:
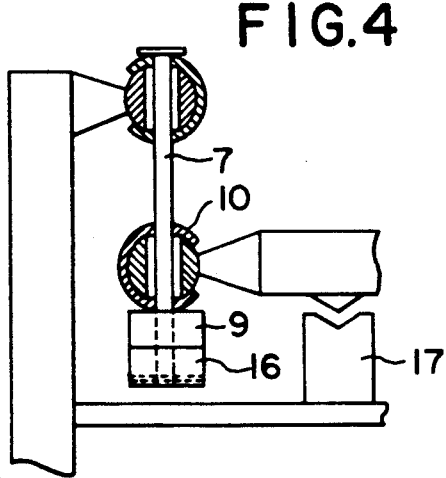

Fig. 4 shows an embodiment in which the load indicator 9 is positioned between the cylinder 16 and the spherical part 5 of the lower universal joint 10. The working of this device corresponds with that of the device shown in the FIGS. 1-3.

Figure 5:
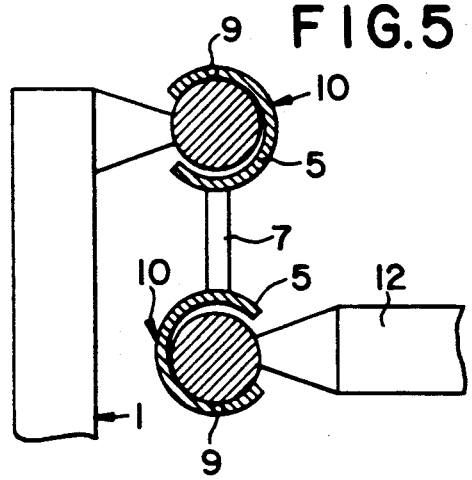

FIG. 5 shows an embodiment mainly corresponding to that of FIG. 1. Now, however, the bar 7 is fixedly connected to the two spherical parts 5 of the universal joints 10 and a load indicator 9 is directly mounted in one or both of said spherical parts 5. When two load indicators are present they can be used for mutual comparison.

FIG. 6 shows an embodiment in which each universal joint 18 is formed by a semi-ball-shaped part 19 connected to either the framework 1 or to the loadingframe 12 and being supported by a corresponding hollow part 20. The part 20 of both joints 18 are comprised within a housing 21 in which the load indicator 9 and the cylinder 16 are positioned. FIG. 6 shows the active position of the device and in FIG. 7 the position of the loadingframe 12 is indicated when this is supported by the supports 17 of the framework 1. In that case the piston 15 connected to the housing 21 is moved downwardly in the cylinder 16.

Figure 8:
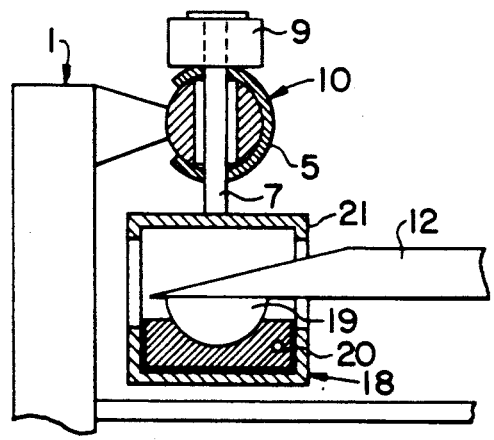
FIG. 8 shows a section according to FIG. 6, yet of a further modified embodiment.

FIG. 8 shows an embodiment in which the universal joints 10 and 18 described above are used in combination with each other. The bar 7 of the one joint 10 is connected to the housing 21 of the other joint 18.

FIG. 9 shows an end view of a part of a device comprising a housing 21 formed by various—not futher indicated—parts. In the housing 21 the load indicator 9 and the pressurized medium cylinder 16 with the piston 15 are mounted. By means of the universal joints 10 the framework 1 and the loadingframe 12 are supported.

FIGS. 10 and 11 show the working of the device of the FIGS. 6 and 7 when the pressurized medium cylinder 16 is simultaneously used as load indicator 9. In FIG. 10 the loadingframe 12 is supported by the supports 17 of the framework 1. When pressurized fluid is supplied to the cylinder via tube 22 the housing 21 can be moved upwardly so that the loadingframe 12 is moved in the same direction as indicated by arrow V and will reach the position indicated in FIG. 11. When a load is placed onto said loadingframe 12 the pressure of the fluid below the piston 14 will increase and can be determined by the load indicator 9 by bringing the valve 23 to the other position.

The FIGS. 12 and 13 show the possibility to provide the outer portions 5 of two universal joints 10 with outwardly extending arm 24 and 25 resp., the ends of which are connected to each other by bolts 26. In the one arm 24 the power take up member with the load indicator 9 is incorporated.

The FIGS. 14 and 15 show the same device as FIG. 12, the arm 24, however, being connected to an arm 27 forming a counter-weight to equalize the weight of the arms 24 and 25 and the parts connected to these.

FIGS. 16 and 17 show another type of universal joint 28, by which an element 29 is used which is provided with a load indicator 9 to determine the load which is exerted onto said element 29. The element 9 connects the framework 1 to the loadingframe 12 in a flexible way.

The FIGS. 18 to 22 show various possibilities for applying a load indicator 9 between two arms 24 and 25 which in the way as described in case of the embodiment shown in FIG. 12 are fixedly connected to the parts 5 of the universal joints 10 and are connected to each other with their other ends at position 30.

Figure 18:
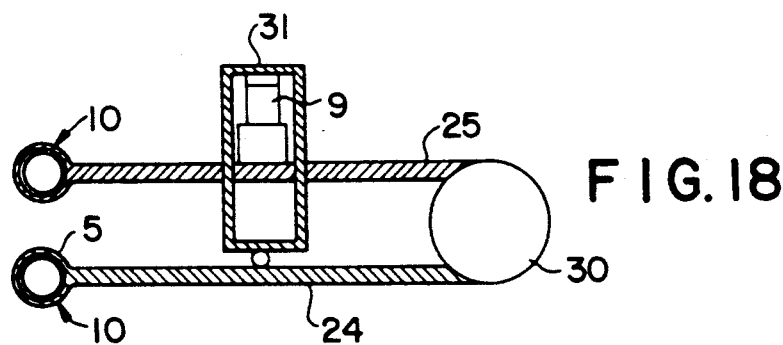
Figure 19:
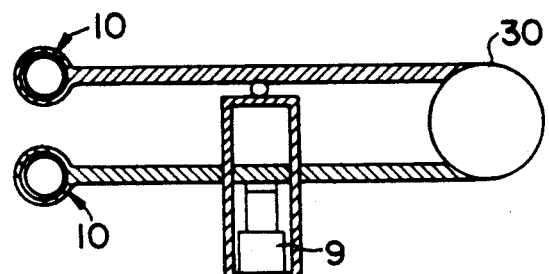

Incase of the embodiment according to the FIGS. 18 and 19 the load indicators 9 are positioned inside a housing 31 which is pivotably connected to one of the arms 24 or 25 and which supports the indicator 9 so that a compression force is exerted on this indicator 9.

Figure 20:
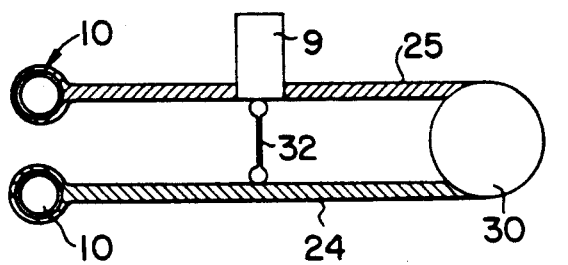
Figure 21:
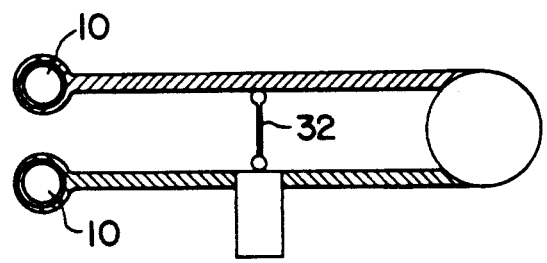

In case of the embodiment according to the FIGS. 20 and 21 the load indicator is fixedly provided in one of the arms 24 or 25 and a force is exerted on it by the other arm via a bar 32.

Figure 22:
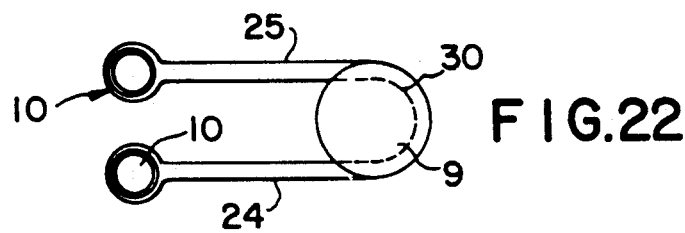

FIG. 22 shows the possibility to provide a load indicator 9 in the connecting point 30 between the two arms 24 and 25. In this case the load indicator 9 might be one suitable for measuring a bending load.

Figure 23:
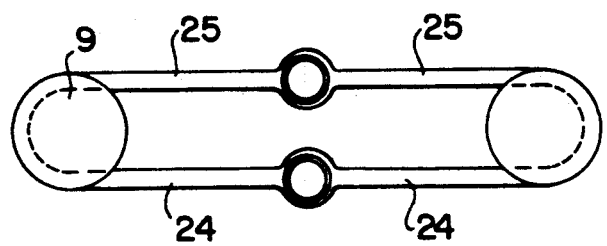

FIG. 23 shows the possibility to double the arms 24 and 25 as used in the embodiment of FIG. 22 so that the excentric weight of said arms and of the load indicator is equalized.

It has to be remarked that obviously a means will be present for adding up the loadings exerted on the various load indicators present in a device to determine the weight of a load positioned onto a loadingframe 12.

It will be obvious that only some possible embodiments of a device according to the invention are shown in the drawing and are described above and that many modifications and combinations can be made without departing from the invention concept.

I claim:

1. Mobile device for weighing a load, such as a weighing device which can be mounted on a truck, comprising a framework and a loadingframe being flexibly connected to each other by means of connecting elements such that the line running through the connecting points will always extend in vertical direction when a weighing is carried out, a free space being present around the loadingframe such that it remains free from the portions surrounding it also when the device is in an oblique position during weighing, power receiving members being present comprising load indicators for measuring the load exerted on said connecting elements, characterized in that each connecting element is connected to both the framework and the loadingframe by means of a universal joint, said universal joints being integrated into the power receiving members so that they are positioned at a minimum distance from each other and that the load indicator, present in said power receiving member is positioned outside the space between said two universal joints.

2. Device according to claim 1, characterized in that the center of a load indicator lies on the center line of the two joints belonging to it, the load indicator being positioned such that it will always be in pressed condition during weighing.

3. Device according to claim 1, characterized in that the power receiving member comprises a bar both ends of which are coupled with a portion of the two universal joints cooperating with it, said bar extending through at least one of the joints and the load indicator present near this joint and the end of the bar extending outside said load indicator being provided with a means by which it engages that side of the load indicator lying opposite the side which engages said universal joint.

4. Device according to claim 3, characterized in that said bar or said housing are connected to a pressurized medium cylinder extending in respect of said bar either said housing and said universal joints in such a way that by means of it said loadingframe can be brought to a position in which it engages fixed supports.

5. Device according to claim 4, characterized in that the pressurized medium cylinder serves as load indicator by measuring the pressure in said cylinder during weighing.

6. Device according to claim 1, characterized in that said power receiving member comprises a bar both ends of which are connected to a portion of the two universal joints cooperating with it, said load indicator being positioned in the relating portion of one of said universal joints opposite the place where said bar is connected to said portion.

7. Device according to claim 1, characterized in that said power receiving member comprises a housing extending around said universal joints and provided with sidewardly directed openings through which the parts of framework and loadingframe, connected to the universal joints, extend, said load indicator being comprised in said housing.

8. Device according to claim 1, characterized in that said connecting element, which is connected to both universal joints, extends outside the space between said universal joints.

9. Device according to claim 8 claims, characterized in that the universal joints are provided with means for equalizing the excentric weight of the arms and further parts connected to them.

10. Device according to claim 8, characterized in that said arms extend from both sides of said universal joints to obtain a symmetrical construction.

11. Device according to claim 8, characterized in that said connecting element is formed by arms extending substantially in horizontal direction from said universal joints, the ends of said arms opposite the universal joints being connected to each other.

12. Device according to claim 11, characterized in that the load indicator is provided in one of said arms.

13. Device according to claim 11, characterized in that the load indicator is positioned between both arms and at a position between the universal joints and the ends of said arms which are connected to each other.

* * * * *